United States Patent [19]

Payne

[11] 4,136,149

[45] Jan. 23, 1979

[54] MOLDED RUBBER ARTICLE AND METHOD

[75] Inventor: Roger A. Payne, Parker, Colo.

[73] Assignee: The Gates Rubber Company, Denver, Colo.

[21] Appl. No.: 816,568

[22] Filed: Jul. 18, 1977

Related U.S. Application Data

[62] Division of Ser. No. 685,200, May 10, 1976.

[51] Int. Cl.² .............................................. B29C 17/06
[52] U.S. Cl. .................................... 264/300; 138/126; 138/137; 264/236; 264/331; 264/508; 264/DIG. 52
[58] Field of Search ....... 264/331, 300, 338, DIG. 52, 264/94, 166, 236; 138/137, 126

[56] References Cited

U.S. PATENT DOCUMENTS

| | | | |
|---|---|---|---|
| 2,301,207 | 11/1942 | Garretson | 264/166 |
| 3,497,587 | 2/1970 | Ikeda et al. | 264/255 |
| 3,528,260 | 9/1970 | Binder | 62/498 |
| 3,881,521 | 5/1975 | Johansen et al. | 264/209 |

*Primary Examiner*—Jeffery R. Thurlow
*Attorney, Agent, or Firm*—Curtis H. Castleman, Jr.; Raymond Fink; H. W. Oberg, Jr.

[57] ABSTRACT

A molded rubber article is described having an exterior or surface layer which is formed of a blend including a heat setting rubbery polymer, and a halogenated polyethylene acting as an internal mold release agent during processing and also enhancing the surface qualities of the molded article.

4 Claims, 2 Drawing Figures

MOLDED RUBBER ARTICLE AND METHOD

This is a division of application Ser. No. 685,200, filed on May 10, 1976.

BACKGROUND OF THE INVENTION

This invention pertains to molded rubber goods made at least partially of a heat setting rubbery polymer which has been cured against an associated mold surface.

Many types of rubbery polymers when cured under heat and/or pressure against a mold surface (usually of metal), have a tendency to adhere at least partially to that mold surface unless a mold release agent, such as mica dust, is applied to the mold surface or rubber article prior to molding. EPDM-type polymers are typical of this group of rubbery polymers which, without the aid of a mold release agent, oftentimes will stick to the mold surface and also present a rather dull exterior surface appearance. This dull surface is believed to be attributable at least in part to the poor release from the mold surface, and/or to blooming of accelerators or other additives compounded into the EPDM stock. Hose articles, for instance, are generally considered more acceptable when the exterior surface is smooth and relatively shiny rather than dull or dusty as a result of blooming at the surface or because of the presence of residual amounts of mold release agent.

It is a primary object of the subject invention to provide an exterior surface for molded rubber articles which will release from an associated mold without the need for a separate mold release agent, without the need to wash or otherwise remove mold release agent from the molded article, and which will enhance the surface properties of the article by presenting a smoother, shinier surface with minimized tendency to bloom.

SUMMARY OF THE INVENTION

Briefly described, the molded rubber article of the subject invention includes an exterior surface or cover, as in the case of hose for instance, which is comprised of (1) a heat setting rubbery polymer which is normally, by itself, at least partially adherent to an associated mold surface, blended with (2) a halogenated polyethylene, which unexpectedly functions as an internal mold release agent and also as a surface and appearance improvement aid for the molded rubber article.

A method for molding such articles is also disclosed.

BRIEF DESCRIPTION OF THE DRAWINGS

The invention will be more particularly set forth in certain illustrated embodiments by reference to the accompanying drawings, in which.

PREFERRED EMBODIMENTS OF THE INVENTION

Figure 1:
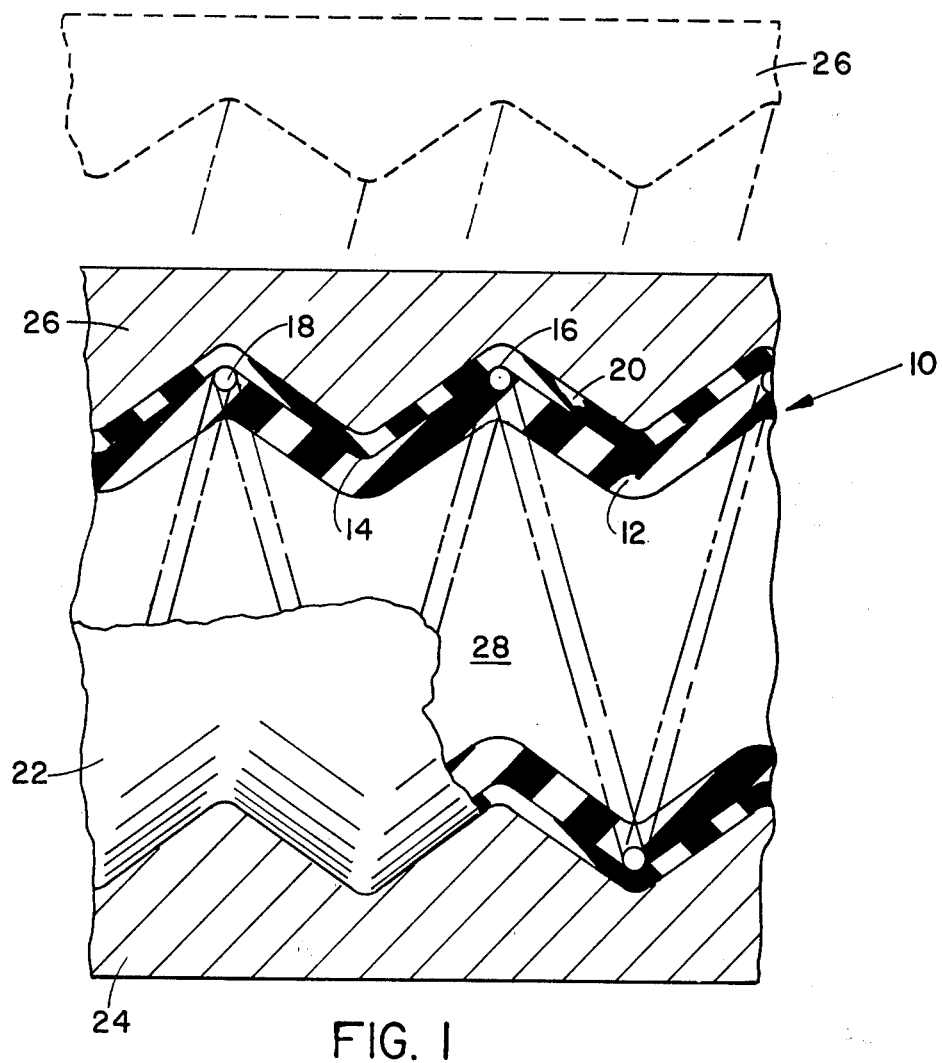
FIG. 1 is a fragmentary partial sectional view of a cured corrugated hose shown in position within an associated mold for curing the same.

The invention is not limited to the hose or conduit articles set forth in the drawings for illustrative purposes, and rather the invention applies to all types of molded rubber articles utilizing a heat setting rubbery polymer cured adjacent a mold surface. Other types of molded articles falling within the scope of the invention include such diverse products as air-brake diaphragms, rubber-lined pumps, and endless belting.

Referring now to FIG. 1, a hose generally designated at 10 comprises a helically corrugated inner tube 12, having outward helically fashioned valleys 14 and crests 16. At substantially the apex of the crests 16 are disposed convolutions of spiral reinforcement 18, which may be made of spirally coiled spring wire preformed to the desired pitch and diameter.

The outer surface of the hose, which is also helically corrugated, carries outer or exterior surface layer 20. This cover may include an embedded reinforcement such as a fabric, knit or spiral reinforcement (not shown), however, at least an outer skim rubber layer will be present on the outermost surface 22 of the hose.

In accordance with the invention, at least this outermost surface layer 22 of the hose is formed of a blend of a heat setting rubbery polymer, which by itself is normally at least partially adherent to an associated metal mold surface 24, 26, and a halogenated polyethylene, which is preferably also in the form of a rubbery heat setting polymeric material.

Various heat setting rubbery polymers, normally at least partially adherent to the mold surface, are contemplated according to the invention. Preferred polymers include polymers in which at least one of its monomeric components is an olefin having preferably 2–4 carbon atoms, and is most preferably ethylene or propylene. Examples include EPR (ethylene-propylene rubber) and chlorosulfonyl polyethylene. As another example, neoprene is contemplated. However, the invention especially pertains to heat setting rubbery EPDM-type terpolymers. By EPDM-type terpolymers is meant elastomers prepared by interpolymerizing a monomeric mixture containing ethylene, a higher mono-olefin containing 3–10 carbon atoms preferably, and a poly-olefin which is preferably a nonconjugated diene. Conventional EPDM elastomers are formed from monomeric mixtures containing ethylene, propylene and either cyclic or acyclic nonconjugated dienes, for example ethylidene norbornene and dicyclopentadiene. The molar ratios of ethylene to propylene preferably vary in the range from about 45:55 to about 75:25.

The halogenated polyethylene additive, which functions as an internal mold release agent, inter alia, is preferably either the brominated or chlorinated polyethylene type rubbers. Chlorinated polyethylene (CPE) elastomers are well known and are presently commercially available. These elastomers may be manufactured using various methods, although common processes involve solution, dry or aqueous slurry chlorination. Various polymers may be produced through variation of chlorine level, polyethylene molecular weight, molecular weight distribution and other well known techniques. The resultant rubbers made by these processes are normally free flowing powders and may have particle sizes in the range of 300–500 microns. The elastomeric CPE polymers generally possess molecular weights from about 1,000 to about 100,000, chlorine content between about 20 and 60 percent by weight, and are amorphous in nature.

The heat setting rubbery polymer, such as EPDM, and halogenated polyethylene are blended together in homogeneous fashion, and this may be accomplished in known manner such as with the aid of a mill or Banbury-type mixer. Various compounding additives may be added in standard manner and include such materials as fillers, softeners, age resistors, accelerators (particularly when relatively unsaturated polymers such as EPDM are employed) and activators. According to the invention, it is preferred that at least about 2 weight percent, more preferably at least about 10 weight percent, and most preferably in the range of from about 12 to about 175 weight percent of the halogenated polyethylene is employed based on the weight of the heat setting rubbery polymer (e.g., EPDM). The precise ratio of halogenated polyethylene to heat setting rubbery polymer will vary according to the natural mold release properties of the heat setting rubbery polymer and its natural exterior sheen.

While the invention does not apply to the method of making the hose shown in FIG. 1, reference is made to U.S. Pat. No. 3,274,316 to Songer, which does disclose a conventional method for making such hose. In general, the tube 12 may be formed of a continuous extrusion cut to desired length, and onto which is telescoped coiled spring 18 and outer tubular cover 20. The uncured hose preform consisting of the tube, reinforcement and cover is then positioned between retractable mold halves 26 and 24 without the need for dusting the mold or preform. Steam under pressure may then be admitted within the interior 28 of the cavity and the preform below molded against the corrugated mold cavity surfaces. After the hose has been cured, upper mold half 26 may be withdrawn upwardly as shown in phantom in FIG. 1, and the vulcanized hose may then be removed from the lower half of the mandrel without any sticking or adhering to the mold surfaces.

The just described example pertains to blow molding of a rubber article against an associated rigid mold surface, which is preferably of metal such as steel. In general, any mold surface of either a permanent or temporary configuration may be utilized. In the example shown in FIG. 2, a molded hose article is formed using a conventional lead press process, and in this case the extruded lead sheath 30 acts as the confining mold. The hose illustrated comprises an inner tube 32, a rubber cover 34 compounded of a blend of heat setting rubbery polymer and halogenated polyethylene in accordance with the subject invention, and an optional interposed embedded reinforcement 36. The tube may be formed of the same material as (and in fact may be integral with) the cover.

Figure 2:
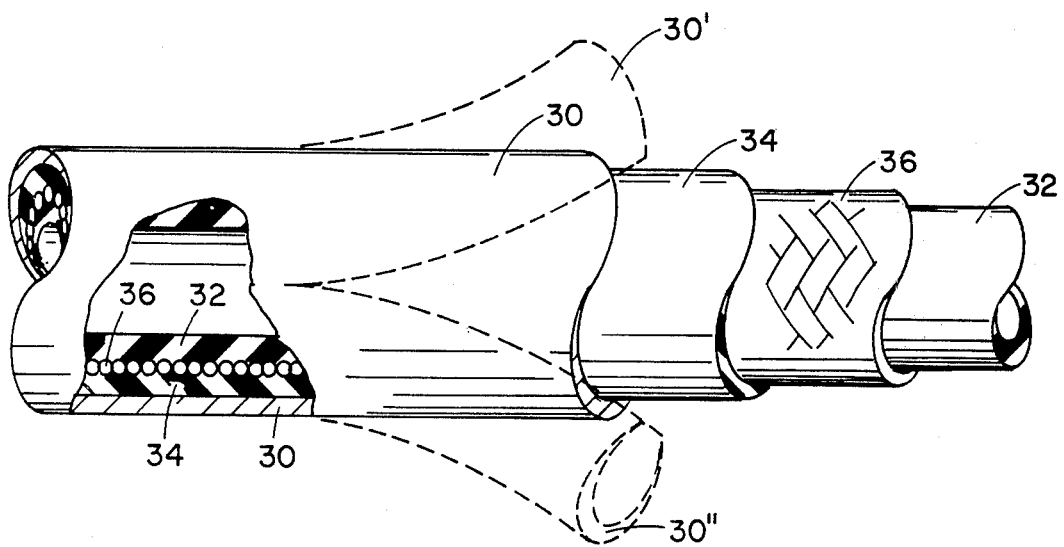
FIG. 2 is a partial sectional, broken away view of a reinforced hose article encased in an outer lead sheath used in curing the hose.

In conventional manner, the hose of FIG. 2 is formed by twining the reinforcement 36 about the extruded tube 32, extruding the cover 34 over the reinforced tube, and then extruding lead sheath 30 over the cover 34 with the aid of a lead press. Also in known manner, the lead sheathed hose may then be rolled up on large drums and pressurized internally (within tube 32) with steam or other fluid curing medium to cure the hose against the outer mold surface formed by the lead sheath, which is generally inexpansible. Subsequent to curing, in conventional manner the lead sheath may be slit and drawn away from the hose as shown at 30', 30". Again, the halogenated polyethylene which is blended into the cover member 34 provides an internal mold release permitting the lead sheath 30', 30" to be stripped away from the hose without residual tearing or adherence to the exterior surface of the hose. As in the case of the embodiment of FIG. 1, no separate mold release agent, such as mica dust need be utilized. The exterior surface of cover 34 is smoother and shinier than would be produced without the halogenated polyethylene additive, has reduced tendency to bloom and improved flame resistance.

A representative cover stock recipe, which was employed in cover 20 of the corrugated hose of FIG. 1, is set forth as follows, with parts by weight:

| Component | Parts |
| --- | --- |
| EPDM (Exxon Vistalon-trademark) | 100. |
| Carbon Black | 245. |
| CaCO$_3$ | 62.5 |
| ZnO | 5. |
| Stearic Acid | 2. |
| CPE (36 wt. % chlorine, 50–70 Mooney viscosity, 1.61 specific gravity) | 12.5 |
| Sulfur | 1. |
| Accelerator (Mots 1, American Cyanamid) | 1. |
| Accelerator (mercaptobenzylthiozole) | .5 |
| Paraffin wax | 6.2 |
| Oil | 182 |

It will be understood that the invention is capable of a variety of modifications and variations which will become apparent to those skilled in the art upon a reading of this specification, the scope of the invention being defined by the appended claims.

What is claimed is:

1. A method for releasing an externally molded rubber article from its associated metal mold surface, the outer surface of the article being comprised of a heat setting rubbery polymer normally adherent to the mold surface upon its release, without requiring use of a separate external mold release agent, comprising:
    blending and incorporating with said heat setting rubbery polymer, prior to molding, from about 2 to about 175 weight percent of a chlorinated or brominated polyethylene based on the weight of the rubbery polymer to form a rubbery blend;
    positioning the outer surface of the article, having said blend, against the mold surface and curing the article; and
    removing the thus formed molded article from the mold.

2. The method of claim 1 wherein no external mold release agent is employed, and the article removed from the mold releases without residually adhering to the mold surface.

3. The method of claim 1 wherein the heat setting rubbery polymer is a terpolymer of ethylene, propylene and a nonconjugated diene.

4. The method of claim 1 wherein the rubber article is a hose having a cover, and the heat setting rubbery polymer used in the cover has as a monomeric component an olefin having from 2–4 carbon atoms.

* * * * *